June 1, 1965 S. GARDNER ETAL 3,187,200

TRIGGER CIRCUIT FOR A HIGH SPEED FLIP-FLOP

Filed Feb. 12, 1962

STEPHEN GARDNER
JONEL D. SUTTON
INVENTORS

BY George B. Oujevolk
Sal A. Giamataua
ATTORNEYS

United States Patent Office 3,187,200

Patented June 1, 1965

3,187,200

TRIGGER CIRCUIT FOR A HIGH SPEED FLIP-FLOP

Stephen Gardner, Passaic, and Jonel D. Sutton, Clifton, N.J., assignors to General Precision Inc., Little Falls, N.J., a corporation of Delaware Filed Feb. 12, 1962, Ser. No. 172,391
1 Claim. (Cl. 307—88.5)

Figure 1:
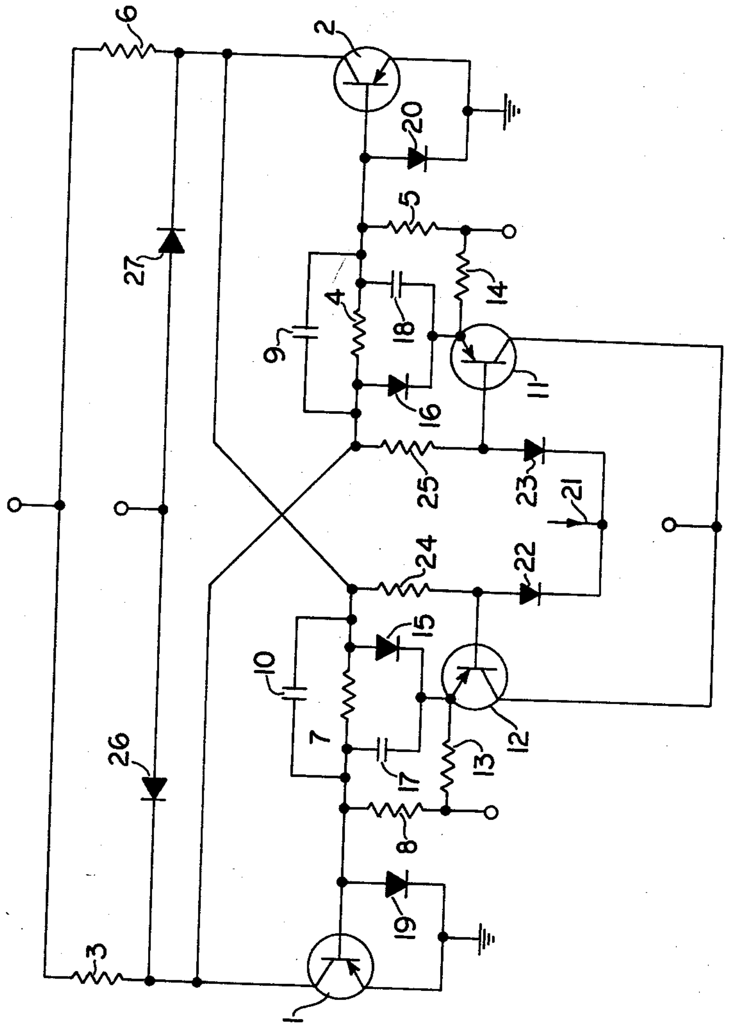

The present invention relates to a bistable multivibrator circuit, and more particular to this type of circuit which is to be used as a trigger circuit for a high speed flip-flop operating at a frequency of the order of 50 megacycles.

Bistable multivibrators are well known in the art and a typical Eccles-Jordan bistable multivibrator is disclosed on page 203 in the Department of the Army Technical Manual, TM11–690, "Basic Theory and Application of Transistors" March 1959. The circuit there shown is for conventional computer use, and, in conventional computers, the bottleneck is usually at the printing or readout station since the computer can of course not function more rapidly than it is possible to print out or read out the information derived therefrom by the human operators. Usually, whether the computer can supply information in one millisecond or several milliseconds is therefore not too important. In space navigation, however, this is not the situation. There is usually no readout of the computer information but this information is fed to other components of the system to perform navigational functions. Furthermore, microseconds are of prime importance as the vehicle is traveling through space at a very high rate of speed and must respond promptly to navigational directions. Then, a few microseconds of time mean the difference between success and failure of a mission. In the conventional bistable multivibrator, there are two trigger transistors. One of these is conducting and the other is cut off. Upon receipt of the proper input, the cut off transistor goes to the conducting state and the conducting transistor to the cut off state. But, the operation is sequential and not simultaneous. It is obvious that a push-pull simultaneous operation would save or halve the time of a sequential operation.

The design of high frequency devices however presents problems not found at the lower frequencies. In some cases, the response time of the components is too slow to permit their use. In other cases, components which will operate in a satisfactory manner at lower frequencies will not function at the higher frequencies.

Although attempts were made to overcome the foregoing difficulties and other difficulties, none, as far as we are aware was entirely successful when carried into practice on an industrial scale.

It has now been discovered that a trigger circuit can be provided having a simultaneous rather than a sequential response.

Thus, it is an object of the present invention to provide a trigger circuit for high speed flip-flops used to steer input pulses to the properly conditioned trigger transistor of the flip-flop and to speed the changing operation of the flip-flop by driving the saturated transistor out of saturation and by driving the capacitance load that may be at the output of the flip-flop with the input pulse.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

The single figure is a schematic diagram of the circuit herein contemplated as the trigger circuit of a high speed flip-flop.

The circuit depicted in the drawing has the usual bistable multivibrator voltage divider networks for two trigger transistors 1 and 2. This network includes on the one hand load resistor 3, time resistor 4 and bias resistor 5. The junction of load resistor 3 and time resistor 4 is fed to the collector of transistor 1, while the junction of time resistor 4 and bias resistor 5 is fed to the base of trigger transistor 2. On the other hand, there is a load resistor 6, a time resistor 7 and a bias resistor 8, the junction of the load resistor 6 and time resistor 7 being fed to the collector of transistor 2, while the junction of the time resistor 7 and bias resistor 8 is fed to the base of transistor 1. In parallel with time resistors 4 and 7 are time capacitors 9 and 10. The time constant of each time capacitor with its time resistor determining essentially the fall time from conduction to cut-off of the transistors 1 and 2. The emitters of the transistors are grounded.

To the foregoing circuit there is now added emitter follower transistors 11 and 12. The emitters thereof are connected to bias resistors 5 and 8 across emitter follower resistors 13 and 14. The switching action of emitter follower transistors 11 and 12 is regulated by a switch circuit going from time resistors 4 and 7, to switch diode 15 and 16, to the emitter of the emitter follower transistor, to a switch capacitor 17, 18, and back to the resistors 4 and 7. The collectors of the two emitter follower transistors are connected together.

To complete the emitter follower network, the grounded emitter of trigger transistors 1 and 2 have a lead from the ground junction to the junction of the transistor base and the bias resistors 5 and 7 across diodes 19 and 20. The input is across diodes 22 and 23 to the base of the two emitter follower transistors to the time resistor of one of the trigger transistors and to the collector of the opposite trigger transistor across input bias resistors 24 and 25. The load resistors 3 and 6 are connected across opposed diode 26 and 27.

The operation of the foregoing circuit may be analyzed by first considering trigger transistor 1 as saturated. To facilitate understanding of the explanation, values have been assigned to the operation. Thus, for trigger transistor 1 $V_{CE}=-.10$ volts. Trigger transistor 2 is cut-off and $V_{CE}=3.5$ volts. At input 21 there is applied a narrow pulse 0 to −3 volts amplitude. The input bias resistor will hold the base of emitter follower transistor 12 at −3.3 volts and block the pulse through input diode 22 when the pulse comes in. Emitter follower 11 provides current gain and directs the input voltage pulse into the switch circuit of diode 16 and capacitor 18. Capacitor 18 provides a path to turn on base current to drive trigger transistor 2 into saturation. Time diode 16 pulls out saturation current from trigger transistor 1 and transistor 1 comes out of saturation. Diode 16 drives any capacitance and resistance load in the collector of trigger transistor 1 to −3 completing the switching action. The next pulse is directed to the other emitter follower 12 and switches the flip-flop by the operation just described to the opposite components. By the foregoing push-pull action, time capacitor 9 is discharged through the low impedance of the diode and the emitter follower in parallel with the collector impedance of trigger transistor 1 instead of just the latter impedance.

With regard to the selection of diodes, the MA 4121 diode made by Microwave Associates Inc. were found suitable for work at 50 megacycles. This, notwithstanding the fact that diodes are not considered suitable for this type of operation (see Richard B. Hurley, Transistor Logic Circuits, John Wiley & Sons, 1961, page 317).

The arrangement has the obvious advantage that it will drive capacitive loads linked to the output of the flip-flop through the emitter follower and coupling diode by the input pulse when the inverter is in the cut-off and active region. This feature also speeds the operation of the flip-flop by removing the saturation current and eliminating the need for anti-saturation design techniques.

It is to be observed therefore that the present invention provides for an improvement in the conventional saturable bistable multivibrator having an emitter follower network and comprises using simple diodes for state steering and switching so as to provide push-pull characteristics to the changeover from one state to the other.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

We claim:

In combination with a high speed bistable multivibrator circuit including a pair of trigger transistors cross-coupled for alternate switching between conductive and non-conductive stable states upon the application of a control signal pulse:

an input terminal for said control signal pulse;

an emitter-follower transistor for each trigger transistor;

respective resistive impedances directly cross-connecting the bases of the emitter-follower transistors and the collectors of the trigger transistors;

a respective RC parallel network directly cross-connecting the base of each trigger transistor to the collector of the other;

a capacitor directly coupling the base of each trigger transistor to the emitter of the respective corresponding emitter-follower transistor;

a pair of diodes connected with like polarity each directly coupling the emitter of one emitter-follower transistor to the collector of the opposite trigger transistor; and a second pair of diodes connected with like polarity each directly coupling the base of a respective one of the emitter-follower transistors to said input terminal.

References Cited by the Examiner

UNITED STATES PATENTS

| | | | |
|---|---|---|---|
| 3,045,128 | 7/62 | Skerritt | 307—88.5 |
| 3,046,413 | 7/62 | Clapper | 307—88.5 |
| 3,047,737 | 7/62 | Kolodin | 307—88.5 |

JOHN W. HUCKERT, *Primary Examiner.*

ARTHUR GAUSS, *Examiner.*